United States Patent
Haga et al.

(10) Patent No.: US 7,506,558 B2
(45) Date of Patent: Mar. 24, 2009

(54) REDUCTION GEAR AND REDUCTION GEAR FRICTIONAL LOAD APPLICATION MEMBER

(75) Inventors: Takashi Haga, Ohbu (JP); Mitsuhiro Tamura, Ohbu (JP)

(73) Assignee: Sumitomo Heavy Industries, Ltd., Shinagawa-Ku, Tokyo (JP)

( * ) Notice: Subject to any disclaimer, the term of this patent is extended or adjusted under 35 U.S.C. 154(b) by 55 days.

(21) Appl. No.: 11/084,525

(22) Filed: Mar. 21, 2005

(65) Prior Publication Data

US 2005/0204844 A1    Sep. 22, 2005

(30) Foreign Application Priority Data

Mar. 22, 2004  (JP)  .............................. 2004-083535

(51) Int. Cl.
*F16H 3/08*  (2006.01)
*F16J 15/32*  (2006.01)

(52) U.S. Cl. ......................................... 74/331; 277/549

(58) Field of Classification Search ................... 74/329, 74/330, 331, 409; 277/634, 635, 636, 549, 277/550, 553, 586; 384/477, 479, 484, 485, 384/487

See application file for complete search history.

(56) References Cited

U.S. PATENT DOCUMENTS

| | | | | | |
|---|---|---|---|---|---|
| 2,253,904 | A | * | 8/1941 | Wilhelm | 277/553 |
| 3,689,084 | A | * | 9/1972 | Smedley | 277/553 |
| 4,433,755 | A | * | 2/1984 | Ohtomi | 187/254 |
| 5,387,040 | A | * | 2/1995 | Firestone et al. | 384/477 |
| 6,186,507 | B1 | * | 2/2001 | Oldenburg | 277/353 |
| 6,692,202 | B2 | * | 2/2004 | Katsuzawa et al. | 409/135 |
| 2003/0173746 | A1 | * | 9/2003 | Ramsay | 277/549 |
| 2006/0051231 | A1 | * | 3/2006 | Scholz et al. | 418/205 |
| 2006/0258501 | A1 | * | 11/2006 | Wormsbaecher | 475/222 |

FOREIGN PATENT DOCUMENTS

JP        2002-115754       4/2002

* cited by examiner

*Primary Examiner*—Roger Pang
(74) *Attorney, Agent, or Firm*—Squire, Sanders & Dempsey, L.L.P.

(57) ABSTRACT

A reduction gear includes a gear case, a plurality of shafts in the gear case, a fixed member, an axially movable member, and a friction applying member. The friction applying member is interposed between the fixed member and the axially movable member, to apply a frictional force to at least one of the plurality of shafts in a radial direction of the shaft.

9 Claims, 4 Drawing Sheets

REDUCTION GEAR AND REDUCTION GEAR FRICTIONAL LOAD APPLICATION MEMBER

BACKGROUND OF THE INVENTION

1. Field of the Invention

The present invention relates to a reduction gear capable of reducing so-called rattle noises and a frictional load application (or generation) member for the reduction gear.

2. Description of the Related Art

In a mechanical reduction gear, a "play" is provided between gears. The play is indispensable for smooth rotation of the gears. However, there is a problem that the presence of a play induces so-called "rattle noises" in operation under a small load.

The rattle noise designates a noise generated by the repeated contact and separation between the tooth surface of a driving-side gear and the tooth surface of a driven-side gear due to the vibration or pulsation of a motor, a variation in load on the driven object side, or the like.

In order to reduce such rattle noises, for example, Japanese Patent Laid-Open Publication No. 2002-115754 discloses a structure for applying a light frictional load to a gear shaft. If a frictional load is applied to the gear shaft, the tooth surface of a driven-side gear is unlikely to be separated from the tooth surface of a driving-side gear. Therefore, the generation of rattle noises can be more reduced.

In the above-mentioned Japanese Patent Laid-Open Publication No. 2002-115754, for example, the structure as shown in FIG. 5(A) or 5(B) has been proposed so as to apply (or generate) a frictional load to the gear shaft.

In the structure shown in FIG. 5(A), a bearing housing 14 housing a bearing 12 of an intermediate shaft 10 therein is extended toward the interior of a gear case 16 to form an extended part 14a. An oil seal 20 for applying a frictional load is interposed between the extended part 14a and the intermediate shaft 10. The extended part 14a has a larger diameter than that of a part of the bearing housing 14, in which the bearing 12 is housed, so as to house the oil seal 20 therein.

In the structure shown in FIG. 5(B), a part of a bearing housing 30 of the bearing 12 is extended toward the gear case 16 to form an extended part 30A. An O-ring 32 for generating a frictional load is housed in the inner space of the extended part 30A.

In the above-described structure shown in FIG. 5(A), however, the extended part 14a of the bearing housing 14, which has a larger diameter, is extended beyond the bearing 12 toward the gear. Therefore, there is a problem that positional interference with another gear is likely to be caused. In particular, if a number of gears are present in the gear case 16 as in the case of a multistage reduction gear, it is often difficult to ensure a space where the oil seal 20 for generating a frictional load is to be provided. The design of increasing the axial length of the gear case 16 for the placement of the oil seal 20 for applying a frictional load is normally unacceptable.

The structure shown in FIG. 5(B) has also a problem that a space is difficult to be ensured if the size is small. Therefore, it is sometimes difficult to house the O-ring 32 of desired size. Moreover, the O-ring 32 is not axially positioned yet to be simply housed between the bearing 12 and the bearing housing 30. Therefore, a thrust load with the deformation of the O-ring 32 may possibly affect an inner ring 12A. If the bearing 12 rotates while an axial load is being applied only to its inner ring 12A, smooth relative rotation between the inner ring and the outer ring is inhibited, inevitably inducing a reduction of lifetime.

In order to ensure that the bearing 12 does not suffer from the axial effects of the O-ring 32, it is necessary to provide a positioning part (a thrust load supporting part) exclusively for the O-ring 32 between the O-ring 32 and the bearing 12. As a result, the structure is more complicated. In addition, the axial length of the gear case 16 is increased in some cases.

SUMMARY OF THE INVENTION

In view of the foregoing problems, various exemplary embodiments of this invention provide a reduction gear having a simple structure, which is capable of applying a frictional load to a shaft, and a frictional load application member which can be used for the reduction gear.

The present invention solves the above problems in a reduction gear including a plurality of shafts in a gear case, the reduction gear comprising: a fixed member; an axially movable member; and a friction applying member applying a frictional force to at least one of the plurality of shafts in a radial direction of the shaft, the friction applying member being interposed between the fixed member and the axially movable member.

In the present invention, the friction applying member is provided to be interposed between the specified fixed member and the specified axially movable member so as to apply a frictional force to a specific shaft in the gear case in the radial direction of the specific shaft. Therefore, the effects of reducing rattle noise can be obtained in a simple structure.

Various specific structures for embodying the present invention can be conceived. For example, the following structure can be adopted. In a reduction gear including a plurality of shafts supported by bearings housed within bearing housings in a gear case, an end of at least one of the plurality of shafts is exposed outside the bearing housing of the bearing supporting the shaft, and an elastic member being interposed between an inner face of the gear case and the bearing housing to be capable of applying a radial pressing force to the shaft, is provided at the end of the shaft.

According to the exemplary structure, the end of the shaft passes through the bearing housing so as to be exposed outside the bearing housing, that is, to the gear case side. The elastic member is interposed between the inner face of the gear case and the bearing housing at the end of the shaft so as to generate a radial pressing force to an intermediate shaft.

The gear case and the bearing housing are existing members. A small space is actually present between the gear case and the bearing housing. By using the space as a space for placing the elastic member, there is no possibility that the elastic member and a gear interfere with each other when the elastic member is provided. Therefore, it is not necessary to extend the gear case in the axial direction.

Furthermore, it is not necessary to provide an additional positioning member (a thrust load supporting part) or the like for the placement of the elastic member. In addition, a thrust force is not applied to the bearing by the elastic member. In general, in order to apply a radial frictional load to a shaft, a member for receiving a counterforce is required on the radial outer side of the elastic member for applying the frictional load. In addition, members for axially positioning the elastic member are required on both sides of the elastic members in the axial direction. For example, an O-ring is suitable as such a kind of elastic member for applying a frictional load. However, if an inner ring of the bearing is responsible for the axial positioning of the O-ring (as in the above-described conventional techniques), there is a possibility that a thrust load may be applied to the inner ring of the bearing. However, according to the above-described exemplary structure, the bearing housing is subjected to the counterforce by the deformation of the elastic member. Therefore, the bearing is not affected by the thrust force generated by the elastic member. Accordingly, the bearing itself can extremely smoothly rotate to maintain high durability. Moreover, since both the bearing housing and the gear case are existing members, it is not necessary to additionally provide a positioning member.

A frictional load can be applied to a specific shaft of a reduction gear with a simple structure, thereby reducing rattle noises at low cost.

BRIEF DESCRIPTION OF THE DRAWINGS

Various exemplary embodiments of the present invention will be described in detail with reference to the accompanying drawings, wherein.

DETAILED DESCRIPTION OF THE PREFERRED EMBODIMENT

Figure 1:
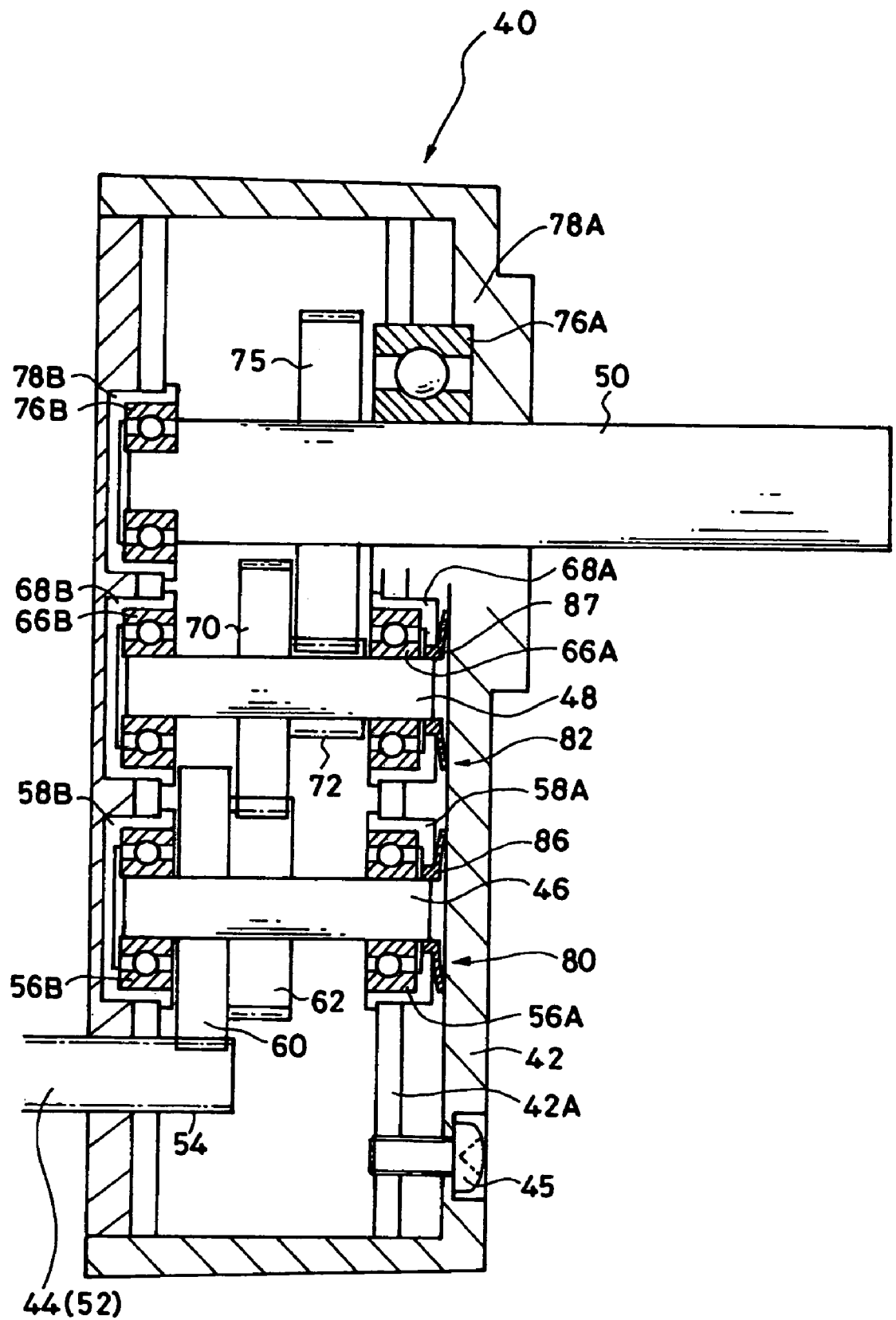
FIG. 1 is an overall longitudinal sectional view of a multi-stage reduction gear with the application of an exemplary embodiment of the present invention.

Hereinafter, examples of a multistage reduction gear with the application of various exemplary embodiments of this invention will be hereinafter described in detail with reference to the drawings.

A multistage reduction gear 40 includes an input shaft 44, a first intermediate shaft 46, a second intermediate shaft 48, and an output shaft 50.

In this exemplary embodiment, a motor shaft 52 of a motor (not shown) also serves as the input shaft 44. The input shaft 44 is exposed in a gear case 42 in a cantilever state. A first pinion 54 is formed at the tip of the input shaft 44 by direct gear cutting. The gear case 42 is connected with a side plate 42A forming a framework of the gear case 42 through a bolt 45.

The first intermediate shaft 46 is supported by a pair of bearings 56A and 56B. The bearings 56A and 56B are housed in bearing housings 58A and 58B, respectively. The first intermediate shaft 46A has a first gear 60 meshing with the first pinion 54 and a second pinion 62.

The second intermediate shaft 48 is supported by a pair of bearings 66A and 66B. The bearings 66A and 66B are housed in bearing housings 68A and 68B, respectively. The second intermediate shaft 48 has a second gear 70 meshing with the second pinion 62 and a third pinion 72.

The output shaft 50 is supported by a pair of bearings 76A and 76B. The bearings 76A and 76B are housed in bearing housings 78A and 78B, respectively. The bearing housing 78A of the pair of bearing housings 78A and 78B, which is on the side where the output shaft 50 protrudes outside the gear case 42, is formed by the gear case 42 itself. The bearing 76A, which is on the bearing housing 78A side, is considerably larger than that of the bearing 76B for a radial load applied to the output shaft 50. The output shaft 50 has an output gear 75.

In this exemplary embodiment, frictional load application (or generation) mechanisms 80 and 82 are provided for both the first intermediate shaft 46 and the second intermediate shaft 48, respectively. The application mechanism 80 includes an elastic member 86, whereas the application mechanism 82 includes an elastic member 87. Since the two application mechanisms 80 and 82 have basically a similar structure, the application mechanism 80 is mainly described herein.

Figure 2:
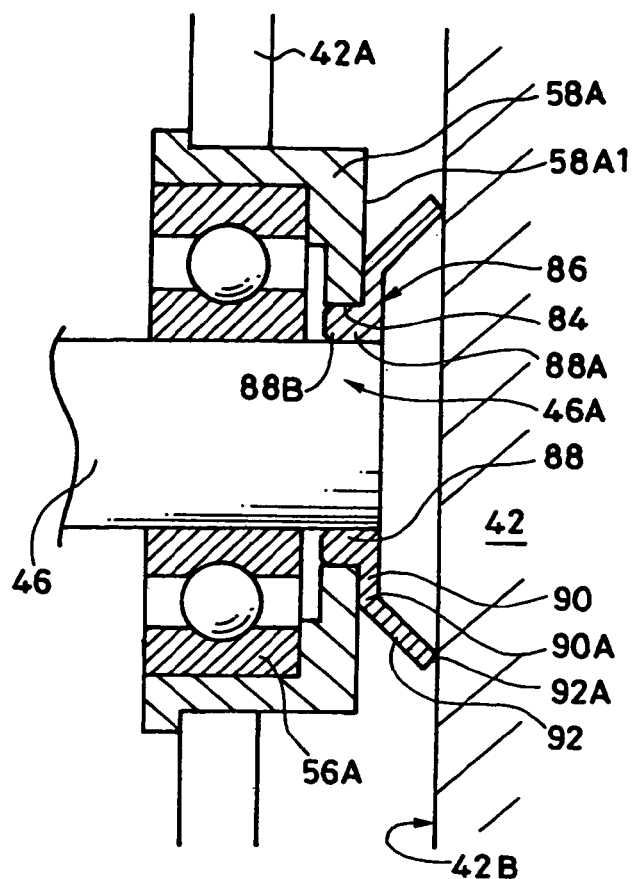
FIG. 2 is an enlarged view showing the vicinity of an end of a first intermediate shaft in FIG. 1.

As shown in FIG. 2 in an enlarged manner, the bearing housing 58A on one side of the first intermediate shaft 46 (on the right side in FIG. 1) includes a through hole 84 formed in the center in a radial direction. An end 46A of the first intermediate shaft 46 passes through the through hole 84 to be exposed outside the bearing housing 58A, that is, to face the gear case 42. The elastic member (the frictional load application member) 86 for applying a frictional load to the first intermediate shaft 46 is provided for the end 46A.

The elastic member 86 includes an axially extending ring part 88, a disc-shaped part (a planar part) 90 formed in continuation with the ring part 88 so as to extend in the radial direction, and a spreading part 92 formed in continuation with the planar part 90. The elastic member 86 is interposed between an inner face 42B of the gear case 42 and the bearing housing 58A. Each of the ring part 88, the disc-shaped part 90, and the spreading part 92 is formed of an elastic material.

More specifically, the ring part 88 axially extends along the outer circumference of the end 46A of the first intermediate shaft 46. The ring part 88 has a ring shape with its inner diameter being set larger than the outer diameter of the first intermediate shaft 46. The disc-shaped part 90 extends in a disc-like shape from an end 88A of the ring part 88 on the gear case 42 side along an outer face 58A1 of the bearing housing 58A. The spreading part 92 spreads from an outer circumferential end 90A of the disc-shaped part 90 toward the gear case 42. An outer circumferential edge 92A of the spreading part 92 is in contact with the inner face 42B of the gear case 42.

With the above-described shape and arrangement, the elastic member 86 constitutes a "lever," in which the outer circumferential edge 92A of the spreading part 92 functions as a power point, the outer circumferential end 90A of the disc-shaped part 90 functions as a supporting point, and an end 88B of the ring portion 88 functions as a point of application.

The functions of the multistage reduction gear 40 will be now described.

A motive power input from the input shaft 44 (the motor shaft 52) is transmitted through the first pinion 54, the first gear 60, the second pinion 62, the second gear 70, the third pinion 72, and the output gear 75 to the output shaft 50.

At this time, a frictional load is applied to the first intermediate shaft 46 and the second intermediate shaft 48 in the following manner.

Figure 3:
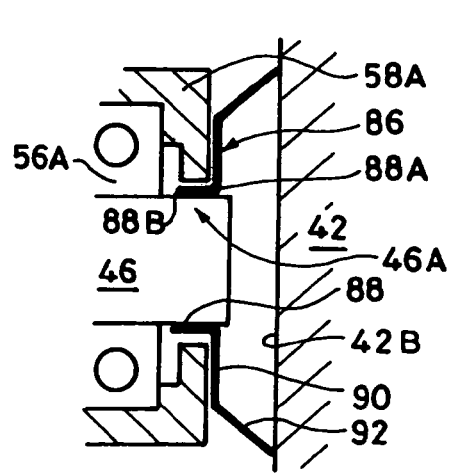
FIGS. 3(A) and 3(B) are schematic views, each showing a deformation state of an elastic member in the above exemplary embodiment.
Figure 3:
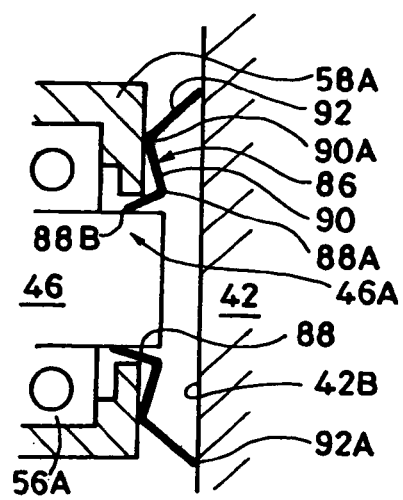

FIG. 3(A) shows a state where the side plate 42A is not screwed to the gear case 42 by the bolt 45 (see FIG. 1) yet, that is, the elastic member 86 is not deformed yet. In this state, the elastic member 86 is simply in slight contact with the outer circumference of the end 46A of the first intermediate shaft 46. Therefore, a pressing force is not generated. Under this state, the side plate 42A is screwed to the gear case 42 by the bolt 45. Then, a distance between the inner face 42B of the gear case 42 and the bearing housing 58A is reduced to deform the elastic member 86 as shown in FIG. 3(B). As a result, the end 88A of the ring part 88 on the gear case 42 side is lifted up by the principle of "leverage" with the outer circumferential edge 92A of the spreading part 92 functioning as a power point, the outer circumferential end 90A of the disc-shaped part 90 functioning as a supporting point, and the end 88B of the ring portion 88 functioning as a point of application. Then, the end 88B of the ring part 88 on the bearing 56A side is pressed against the outer circumference of the end 46A of the first intermediate shaft 46.

As a result, a radial frictional load is applied to the first intermediate shaft 46. While the first intermediate shaft 46 is rotating, a predetermined rotational resistance is generated in the first intermediate shaft 46 at this portion. Therefore, the first gear 60 engaged on the first intermediate shaft 46 rotates while constantly applying a rotational load to the first pinion 54. Even if some pulsation or the like is present in a driving force from the first pinion 54 side, the first gear 60 is not separated from the first pinion 54. Therefore, the generation of rattle noises at the portion where the first pinion 54 and the first gear 60 mesh with each other is effectively prevented.

Since exactly the same effects can be obtained from the frictional load application mechanism 82 for the second intermediate shaft 48, the generation of rattle noises at the portion where the second pinion 62 and the second gear 70 mesh with each other is effectively prevented.

Since the elastic member 86 can be deformed by using the assembly mechanism achieved with the bolt 45 to the side plate 42A of the gear case 42 in this exemplary embodiment, assembly is advantageously easy. Moreover, a special (additional) moving mechanism or the like is not needed.

The deformation force of the elastic member 86 is only applied to the gear case 42 and the bearing housing 58A in addition to the end 46A of the first intermediate shaft 46, which is a target of the application of the deformation force, but is not applied to the bearing 56A at all. Therefore, the bearing 56A can rotationally support the first intermediate shaft 46 with no thrust load. Therefore, high durability can be maintained.

Furthermore, the thrust load generated by the deformation of the elastic member is not applied to the first intermediate shaft 46 either. Therefore, there is no possibility that the thrust load is applied to the bearing 56B on the opposite side through the first intermediate shaft 46.

Moreover, a user can adjust the applied frictional force at the place of use of the reduction gear simply by cutting or scraping the outer circumferential edge 92A of the spreading part 92 or the ring part 88 of the elastic member to a predetermined length, so as to reduce the frictional force.

The specific shape or arrangement of the elastic member in the present invention may be any shape other than the example given in the above exemplary embodiment. In sum, an elastic member for realizing the present invention in a simpler manner can be achieved if an elastic member in such a shape that constitutes the "lever" is prepared. The "lever" acts on the outer circumference of the end of the intermediate shaft with a part of the elastic member functioning as a point of application when a specific portion of the elastic member functions as a supporting point and a contact portion of the elastic member with the gear case functions as a power point. In this case, the outer face of the bearing housing, the inner circumferential face of the through hole in the bearing housing, or the like must function in a good manner to provide the supporting point.

Figure 4:
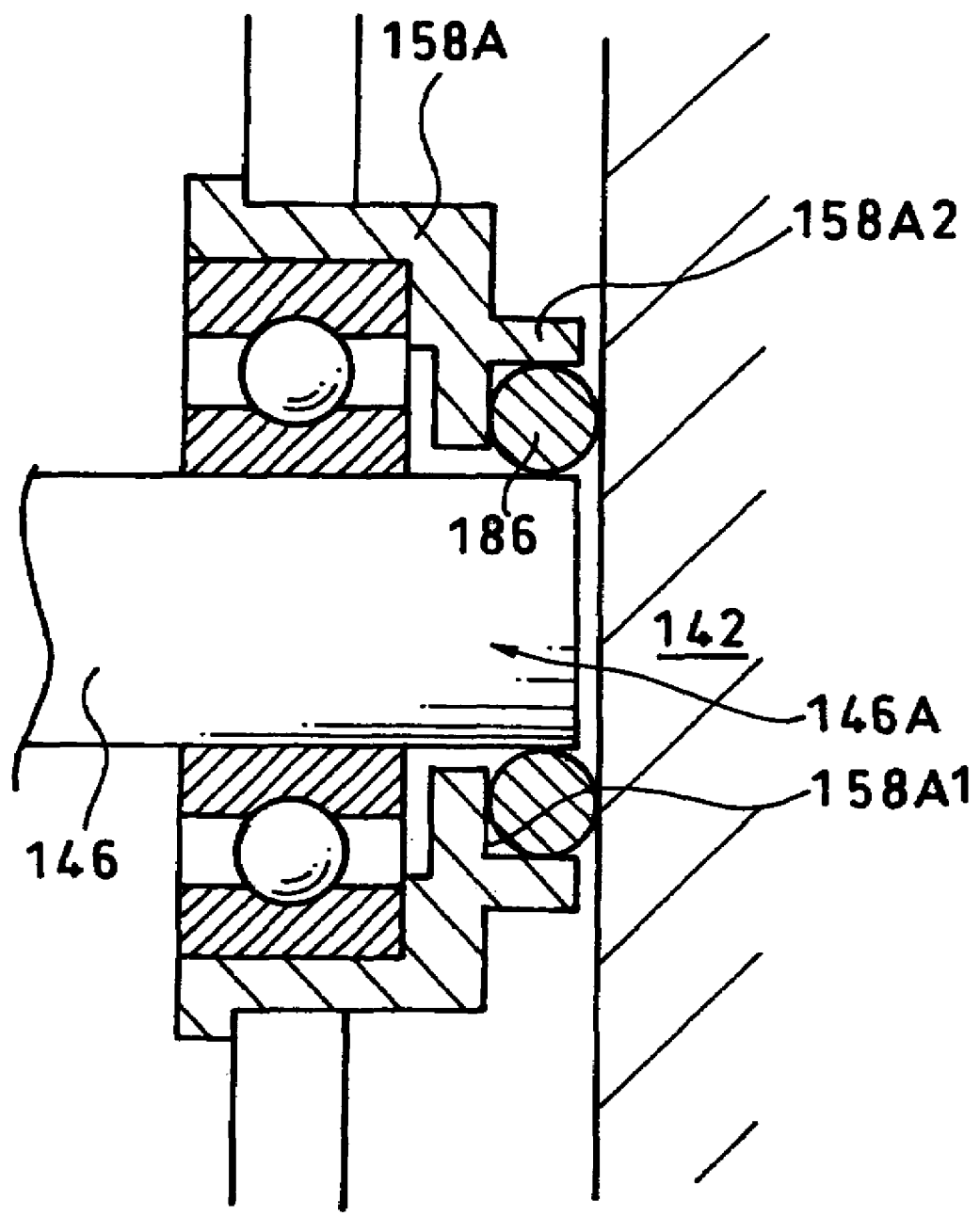
FIG. 4 is an enlarged view equivalent to FIG. 2, showing an example of another exemplary embodiment of the present invention.
Figure 5:
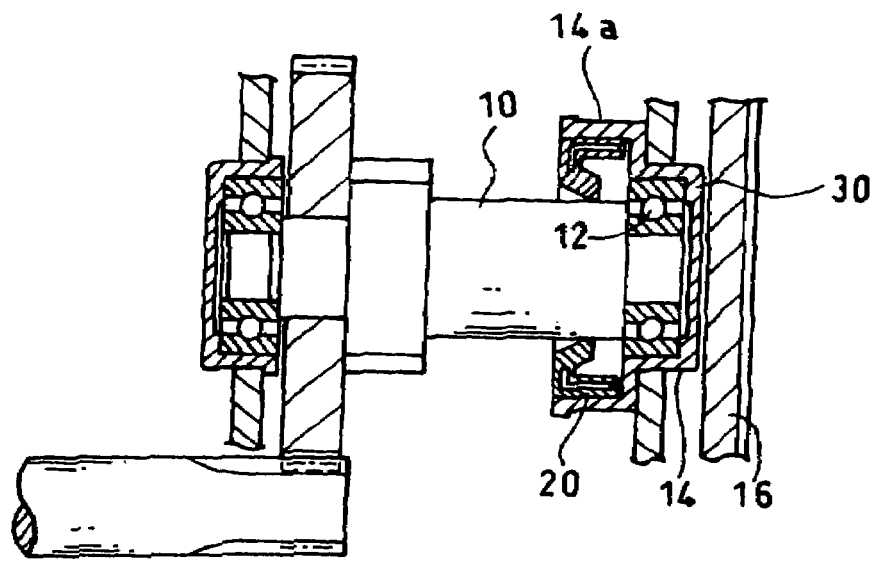
FIGS. 5(A) and 5(B) are enlarged views equivalent to FIG. 2, each showing an example of a conventional structure for applying a frictional load.
Figure 5:
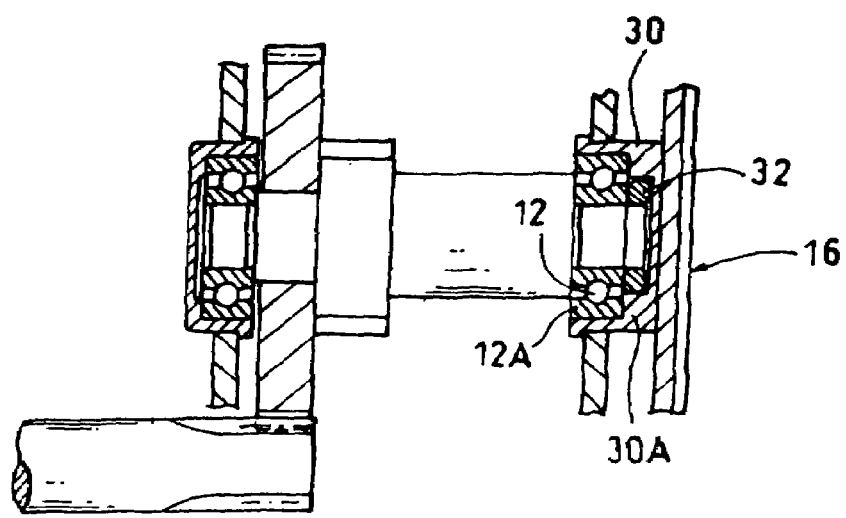

Furthermore, for example, if a protrusion 158A2 protruding toward a gear case 142 is provided for a bearing housing 158A as shown in FIG. 4, an elastic member 186 can also be constituted to be deformed in the inward radial direction by a pressing force from the gear case 142 side while being in contact with an outer face 158A1 of the bearing housing 158A and the protrusion 158A2 at an end 146A of a first intermediate shaft 146. In such a structure, an elastic member having a simpler structure such as an O-ring is satisfactory as the elastic member 186.

Although the protrusion of the bearing housing is integrally formed with the bearing housing in the example shown in FIG. 4, the protrusion may be independently formed. Moreover, instead of providing the protrusion so as to protrude from the bearing housing side, some kind of protrusion may be formed to protrude from the gear case side.

The present invention can be used for a multistage reduction gear, in which rattle noises occurs, so as to reduce rattle noises.

The disclosure of Japanese Patent Application No. 2004-83535 filed Mar. 22, 2004 including specification, drawing and claim are incorporated herein by reference in its entirety.

What is claimed is:

1. A reduction gear comprising:
    a plurality of shafts;
    a fixed member;
    an axially movable member; and
    a friction applying member applying a frictional force to at least one of the plurality of shafts in a radial direction of the shaft, the friction applying member being interposed between the fixed member and the axially movable member so as to be deformed by receiving a force from the axially movable member.

2. A reduction gear comprising:
    a gear case;
    a plurality of shafts supported by bearings housed within bearing housings in the gear case, an end of at least one of the plurality of shafts is exposed outside the bearing housing of the bearing supporting the shaft; and
    an elastic member provided at the end of the shaft, the elastic member being interposed in the axial direction between an inner face of the gear case arranged at a right angle to the shaft and the bearing housing to be capable of applying a radial pressing force to the shaft.

3. The reduction gear according to claim 2, wherein
    the elastic member is formed to have such a shape that constitutes a lever acting on an outer circumference of the end of the at least one shaft with a part of the elastic member functioning as a point of application when a contact portion of the elastic member with the gear case functions as a power point and a contact portion of the elastic member with the bearing housing functions as a supporting point.

4. The reduction gear according to claim 2, wherein
    the elastic member includes:
    a ring part axially extending along an outer circumference of the end of the at least one shaft;
    a planar part extending in an outward radial direction from an end of the ring part on the gear case side along an outer face of the bearing housing; and
    a spreading part spreading from an outer circumference of the planar part toward the gear case so as to be capable of being in contact with the gear case.

5. The reduction gear according to claim 2, wherein:
    the bearing housing includes a protrusion protruding toward the gear case; and
    the elastic member is provided so as to be deformable in an inward radial direction by a pressing force from the gear case side while being in contact with the outer face of the bearing housing and the protrusion at the end of the at least one shaft.

6. The reduction gear according to claim 5, wherein the elastic member is an O-ring.

7. A reduction gear comprising:
a plurality of shafts;
a fixed member;
an axially movable member; and
a friction applying member applying a frictional force to at least one of the plurality of shafts in a radial direction of the shaft, the friction applying member being interposed between the fixed member and the axially movable member,
wherein the fixed member can be assembled through a bolt, and
wherein the elastic member is deformed by a reduction in distance between an inner face of the fixed member and the bearing housing when the bolt is screwed.

8. A reduction gear comprising:
a gear case;
a plurality of shafts supported by bearings housed within bearing housings in the gear case, an end of at least one of the plurality of shafts is exposed outside the bearing housing of the bearing supporting the shaft; and
an elastic member provided at the end of the shaft, the elastic member being interposed between an inner face of the gear case and the bearing housing to be capable of applying a radial pressing force to the shaft,
wherein the gear case can be assembled through a bolt, and
wherein the elastic member is deformed by a reduction in distance between an inner face of the gear case and the bearing housing when the bolt is screwed.

9. A reduction gear frictional load application member comprising:
a ring part axially extending along a shaft in the reduction gear;
a planar part formed in continuation with the ring part so as to radially extend; and
a spreading part formed in continuation with the planar part, the spreading part spreading in the axial direction opposite to the direction where the ring part exists, wherein
the member is made of an elastic material so that at least the spreading part is deformed to deform the ring part in order to press an outer circumference of the shaft at the end of the ring part.

* * * * *